(12) United States Patent
Bavant

(10) Patent No.: US 6,330,228 B1
(45) Date of Patent: Dec. 11, 2001

(54) METHOD AND DEVICE FOR MEASURING THE PROPORTION OF AN ATM CELL STREAM SATISFYING A DETERMINED CRITERION

(75) Inventor: Marc Bavant, Paris (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/147,510

(22) PCT Filed: Jul. 11, 1997

(86) PCT No.: PCT/FR97/01285

§ 371 Date: Jan. 12, 1999

§ 102(e) Date: Jan. 12, 1999

(87) PCT Pub. No.: WO98/02996

PCT Pub. Date: Jan. 22, 1998

(30) Foreign Application Priority Data

Jul. 12, 1996  (FR) .................................................. 96 08736

(51) Int. Cl.$^7$ ..................................................... H04L 12/28

(52) U.S. Cl. .......................... 370/252; 370/395; 708/300; 709/224

(58) Field of Search .................................. 370/395, 230, 370/233, 234, 241, 242, 252; 708/300, 301, 306, 277; 709/224, 232

(56) References Cited

U.S. PATENT DOCUMENTS 5,886,907 * 3/1999 Abu-Amara et al. ................. 364/578
6,144,978 * 11/2000 Bavant ................................. 708/320

* cited by examiner

*Primary Examiner*—David R. Vincent
(74) *Attorney, Agent, or Firm*—Oblon, Spivak, McClelland, Maier & Neustadt, P.C.

(57) ABSTRACT

A process and device for measuring the proportion of ATM cells satisfying a criterion. The process includes allocating a first numerical value to the cells passing through a specified point of an ATM network for satisfying criterion and allocating a second numerical value to the cells which do not satisfy the criterion. An exponential mean is then performed of the string of values thus allocated to each cell.

11 Claims, 2 Drawing Sheets

METHOD AND DEVICE FOR MEASURING THE PROPORTION OF AN ATM CELL STREAM SATISFYING A DETERMINED CRITERION

BACKGROUND OF THE INVENTION

1. Field of the Invention

The present invention relates to a measurement process and device applicable to packet-switched data transmission networks, and in particular to those known by the abbreviation ATM "asynchronous transfer mode".

2. Discussion of the Background

The packets transported in ATM networks are referred to as cells and it may be beneficial to know, at a point of a stream of cells, what is, at each instant, the proportion of cells which satisfy a specified criterion: for example, what is the proportion of cells corresponding to a given connection, to a given service, etc.

If the total rate of the stream of cells is known, as is for example the case when dealing with the stream of ATM cells travelling along a highway with a known bit rate, a measurement of proportion makes it possible to deduce a measurement of bit rate in respect of the cells satisfying the relevant criterion.

In actual essence, such a measurement should give a result at any instant but it should take account of events which have happened in a more or less recent past. A simple sliding average, such as described in patent application WO-A-94/11972, may suffice in numerous cases but the implementation of such an algorithm generally calls upon a circular queue of the latest values, this requiring capabilities for storage and for indexed access to the memory. Moreover, the horizon of this average, that is to say its capacity to store the past depends directly on the physical memory available.

SUMMARY OF THE INVENTION

The purpose of the invention is to alleviate the aforesaid drawbacks by virtue of a process and a device which make it possible to perform a measurement of proportion requiring minimal hardware resources.

To this end, the subject of the invention is a process for measuring the proportion of ATM cells satisfying a criterion at a specified point of a cell-based data transmission network, characterized in that it consists in allocating a first numerical value to the cells passing through the specified point which fulfil the criterion and a second value to the cells which do not satisfy the criterion and in performing an exponential mean of the string of values $u_n$ thus allocated to each cell.

The subject of the invention is also a device for implementing the aforesaid process.

BRIEF DESCRIPTION OF THE DRAWINGS

Other characteristics and advantages of the invention will emerge in the description which follows with regard to the appended drawings which represent.

DETAILED DESCRIPTION OF THE PREFERRED EMBODIMENTS

In its implementation the process according to the invention uses the known process for calculating the exponential mean and which is none other than the result of a discrete-time first-order linear filtering performed on a string of input values $u_n$. The string $x_n$ of states of the corresponding filter is defined by the equation:

$$x_{n+1} = a \cdot x_n + (1-a) \cdot u_n \tag{1}$$

where a is a parameter less than 1, close to 1, which defines the horizon of the filter. The string $x_n$ thus represents a sort of more or less long-term instantaneous mean of the inputs $u_n$. The process according to the invention consists in allocating a first value to $u_n$ when a cell passing at a specified measurement point of an ATM network at an instant n satisfies a specified criterion and by fixing a second value for it when the relevant cell does not satisfy this criterion, then in performing a filtering of the values $u_n$ according to equation (1) so as to obtain at any instant a mean value $x_n$ representing the proportion of the number of cells which satisfy the criterion and which travel past the measurement point in the network.

By way of example, by fixing the first value of $u_n$ at 256 and the second value of $u_n$ at zero and by choosing a notable value for a, such as $15/16$ so as to limit the multiplication and division operations to binary shifts, the value of $x_n$ then gives the sought-after proportion on a scale from 0 to 241.

Figure 1:
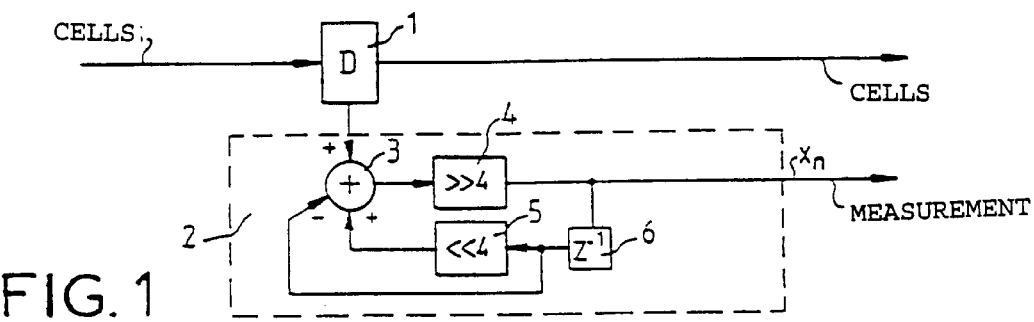
FIGS. 1 and 2, devices for implementing the process according to the invention.

A corresponding device for implementing the process according to the invention is represented in FIG. 1. This comprises a circuit 1 for detecting cells corresponding to the relevant criterion coupled to an exponential mean calculating circuit 2 represented inside a closed dashed line. The detection circuit 1 supplies the value $u_n$ corresponding to the relevant criterion to the input of the calculating circuit 2 and which is read for example from a predefined field of the ATM cell. The calculating circuit 2 comprises an addition operator 3 coupled on a first operand input labelled "+" to a first output of the detection circuit 1. It also comprises a first shift operator 4 which is coupled to the output of the addition operator 3 so as to supply the string of values $x_n$. The output of the first shift operator 4 is coupled to a second operand input labelled "+" of the addition operator 3 by way of a second shift operator 5 and of a delay-by-one-bit circuit 6 which are linked in series. A third operand input labelled "−" of the addition operator 3 is coupled to the output of the delay circuit 6. To correspond to the example cited in which $a=15/16$ and $u_n$ is fixed at 256 or zero, the first shift operator 4 is adjusted to perform a rightward shift by 4 bits, the second operator 5 is adjusted to perform a leftward shift by 4 bits.

Naturally, the same result can be obtained with the aid of a microprogrammed microprocessor. In this case, relation (1) becomes:

$$x_{n+1} = ((x_n << 4) - x_n + u_n) >> 4 \tag{2}$$

where the operators << and >> are the logical shift operators as in the C language.

Figure 2:
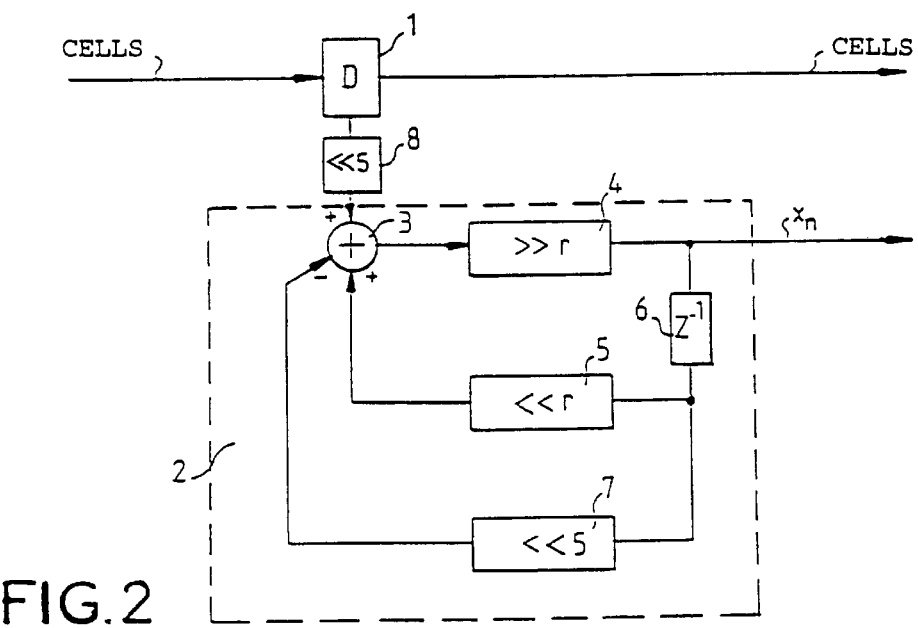

Comparable results can also be obtained with other notable values of a, such as $(2^r - 2^s)/2^r$. For this, it is sufficient to modify the device in the manner represented in FIG. 2 in which the elements akin to those of FIG. 1 are represented with the same references. In this case the first operator 4 is adjusted to perform a rightward shift by r bits and the second operator 5 is adjusted to perform a leftward shift by r bits. The device differs from that of FIG. 1 by the introduction of a third shift operator 7 which must be inserted between the delay device 6 and the addition operator 3 and of a fourth shift operator 8 between the output of the detector 1 and the first operand input of the addition operator 3, both of them so as to perform a leftward shift by s bits. In the case in which a is equal to $(2^r-2^r)/2^r$ and for $u_r=2^q$ or 0 depending on whether the relevant cell does or does not fulfil the criterion in question, the proportion calculated by the following equation lies between 0 and $2^q-2^{r-s}+1$, i.e.:

$$x_{n+1}=(x_n<<r-x_n<<s+u_n<<s)>>r \quad (3).$$

Figure 3A:
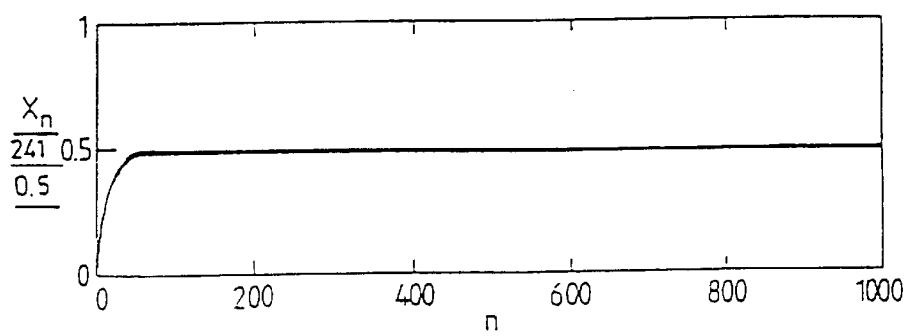
FIGS. 3a to 3c, examples of the results obtained by applying the process according to the invention.
Figure 3B:
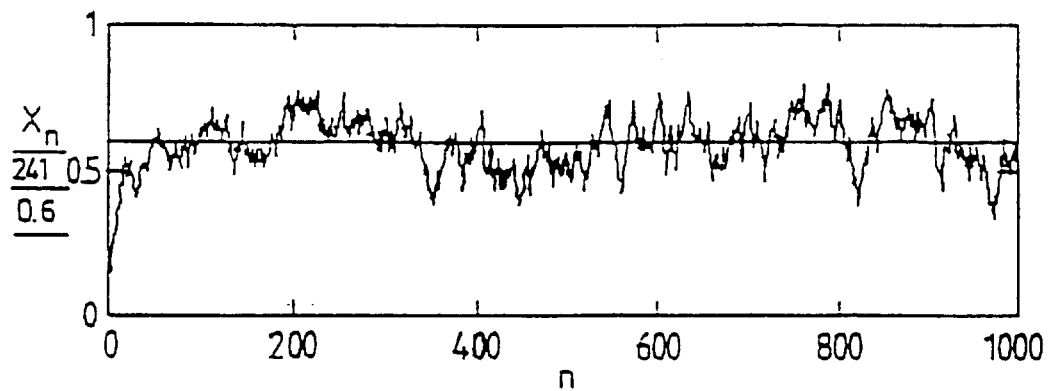
Figure 3C:
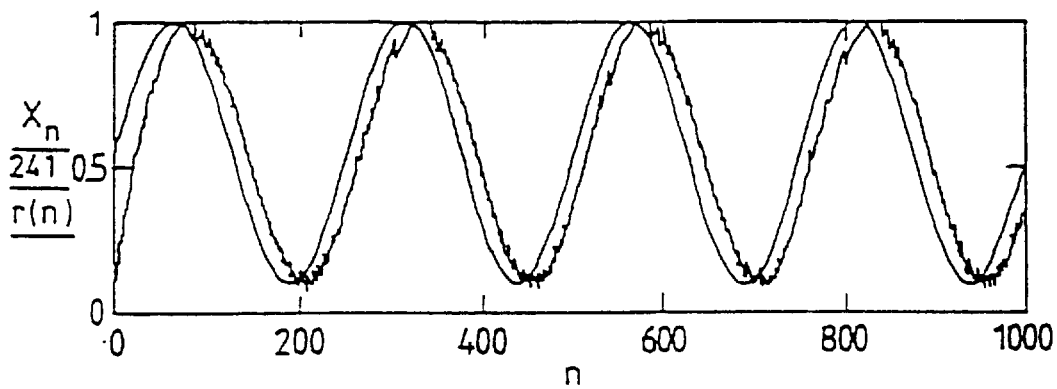

Examples of results obtained by implementing the process according to the invention are shown in FIGS. 3a, 3b and 3c.

The curve represented in FIG. 3a shows the proportion measured when one cell out of two satisfies the given criterion.

The curve represented in FIG. 3b shows the proportion measured when each cell satisfies the given criterion with a probability of 60%. (Chance simulation by a uniform random variable).

The curve represented in FIG. 3c shows the proportion measured when the cell rate satisfying the given criterion is fitted to the thin-line sinusoid. (If the cell at the instant n satisfies the criterion, the next cell satisfying the criterion will arrive at the instant p, the integer part of n+1/r(n)).

What is claimed is:

1. Process for measuring the proportion of ATM cells satisfying a criterion at a specified point of a cell-based data transmission network, characterized in that it consists in allocating (1) a first numerical value to the cells passing through the specified point which fulfil the criterion and a second value to the cells which do not satisfy the criterion and in performing an exponential mean (2) of the string of values $u_n$ thus allocated to each cell.

2. Process according to claim 1, characterized in that the exponential mean (2) of the string of values $u_n$ is performed with the aid of a first-order digital filter defined by the equation:

$$x_{n+1}=a\ x_n+(1-a)u_n$$

where a is a parameter less than 1 but close to 1 and $x_n$ represents the string of states of the filter.

3. Process according to claim 2, characterized in that it consists in allocating the value 256 to the first value of $u_n$ and the value 0 to the second value of $u_n$.

4. Process according to claim 2 characterized in that it consists in allocating the value 15/16 to the parameter "a".

5. Process according to claim 2, characterized in that it consists in allocating a value defined by the relation $(2^r-2^s)/2^r$ to the parameter "a" and the value $2^q$ to the first value of $u_n$ and the value 0 to the second value of $u_n$, in which q, r and s are positive integers.

6. Device for measuring the proportion of ATM cells satisfying a criterion at a specified point of a cell-based data transmission network, characterized in that it comprises a circuit (1) for detecting cells satisfying a criterion $U_n$ coupled with an exponential mean calculating circuit (2) of the string of values $U_n$, composed of a first-order digital filter defined by the equation $X_{n+1}=aX_n+(1-a)\ U_n$ where a is a parameter less than 1 but close to 1 and $X_n$ represents the string of states of the filter.

7. Device according to claim 6, characterized in that the exponential mean calculating circuit (2) comprises
   an addition operator (3) receiving the string of values $u_n$ on a first operand input
   a first shift operator (4) which is coupled to the output of the addition operator (3) so as to supply the string of values $x_n$,
   a second shift operator (5) coupled in series with a delay-by-one-bit circuit (6) between the output of the first shift operator (4) supplying the string of values $x_n$ and a second input of the addition operator (3),
   a third shift operator (7) coupled between the output of the delay-by-one-bit circuit (6) and a third operand input of the addition operator (3) and a fourth shift operator (8) so as to apply the string of values $u_n$ to the first operand input of the addition operator (3).

8. Device according to claim 7, characterized in that the first shift operator (4) performs a rightward shift by r bits, the second shift operator (5) performs a leftward shift by r bits, the third shift operator (7) and the fourth shift operator (8) perform a leftward shift by s bits.

9. Device according to claim 7 characterized in that it comprises shift operators having shift lengths of r=4 and s=0 bits respectively.

10. Process according to claim 3, characterized in that it consists in allocating the value 15/16 to the parameter "a".

11. Device according to claim 8, characterized in that it comprises shift operators having shift lengths of r=4 and s=0 bits respectively.

* * * * *